United States
Wagensonner

3,815,982
June 11, 1974

[54] MOTION PICTURE FADE-OUT AND FADE-IN ARRANGEMENT USING A FLUID CRYSTAL

[75] Inventor: Eduard Wagensonner, Eichenstr, Germany

[73] Assignee: Agfa-Gevaert Aktiengesellschaft, Leverkusen, Germany

[22] Filed: Nov. 13, 1972

[21] Appl. No.: 305,691

[30] Foreign Application Priority Data
Nov. 13, 1971 Germany............................ 2156462

[52] U.S. Cl. .......... 352/91, 95/53 EC, 350/160 LC, 352/217
[51] Int. Cl. ........................................... G03b 21/36
[58] Field of Search ............ 352/91, 217; 95/53 EC; 350/160 LC

[56] References Cited
UNITED STATES PATENTS

| | | | |
|---|---|---|---|
| 2,515,330 | 7/1950 | Bolsey............................. | 352/217 X |
| 3,433,139 | 3/1969 | Beyen.............................. | 95/53 EC |
| 3,476,029 | 11/1969 | Schreckendgust................ | 95/53 EC |
| 3,517,990 | 6/1970 | McGillion....................... | 352/217 X |
| 3,575,491 | 4/1971 | Heilmeier...................... | 350/160 LC |
| 3,597,044 | 8/1971 | Castellano.................... | 350/160 LC |
| 3,655,269 | 4/1972 | Heilmeier...................... | 350/160 LC |

*Primary Examiner*—Monroe H. Hayes
*Attorney, Agent, or Firm*—Michael S. Striker

[57] ABSTRACT

A fluid crystal whose light transmissivity changes as a function of applied voltage is positioned in the path of the light from the objective lens to the film of the camera. Electrical contacts of the fluid crystal are connected to the output and the direction input of an operational amplifier which has an associated timing circuit. Fade-in and fade-out are produced by activation of a switch which alternatively connects the inverting input of the operational amplifier, through a timing resistor, to a battery or to the direct input of one operational amplifier. The fluid crystal is positioned following a standard exposure control circuit in the direction of light propagation towards the film, so that the operation of the exposure control circuit is not affected by the presence of this crystal.

10 Claims, 1 Drawing Figure

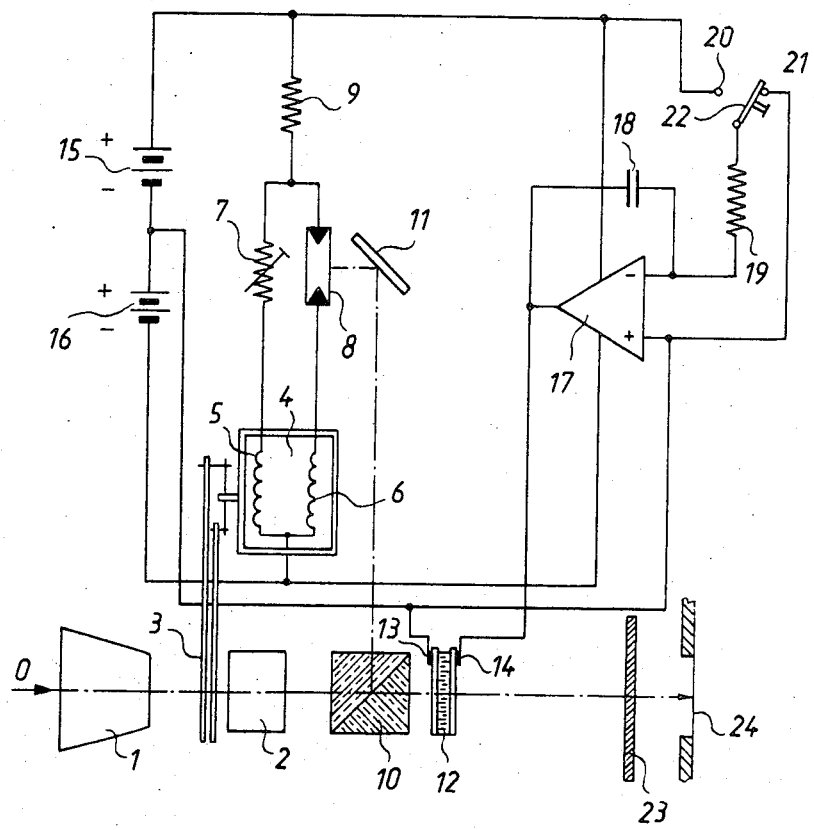

MOTION PICTURE FADE-OUT AND FADE-IN ARRANGEMENT USING A FLUID CRYSTAL

BACKGROUND OF THE INVENTION:

The present invention relates to fade-in and fade-out arrangement for a motion picture camera. It refers to such a camera which also has an exposure control system.

In conventional cameras of this type, the fade-out and fade-in arrangements require considerable room and further are subject to overshoots so that errors in exposure can occur after the termination of the fade-in or the fade-out.

SUMMARY OF THE INVENTION:

It is an object of the present invention to provide a fade-in and fade-out arrangement for a motion picture camera which requires less room than the conventional systems, which is not subject to the overshoots mentioned above and which further is more economical than the conventional systems.

The present invention provides for a fluid crystal which is positioned along the light path from the objective lens to the film of a motion picture camera. The fluid crystal has a light transmissivity which varies in dependence upon an electrical signal applied thereto. In the present invention, timing circuit means are connected to the fluid crystal means for furnishing a timing signal varying as a predetermined function of time upon external activation. Activation of said timing circuit means thus causes the light transmissivity of the fluid crystal to vary as a predetermined function of time. The change in light transmissivity in the fluid crystals takes place with almost no delay whatsoever. Further, of course such crystals do not have moving parts and are, therefore, not subject to overshoots.

In a preferred embodiment of the present invention fluid crystals which change from a light transmissive to an opaque state upon application of a voltage thereto are utilized.

Further, if the motion picture camera has a conventional exposure control system, it is found desirable to position the fluid crystal following such in exposure control arrangement along the path of light from the objective lens to the film. This yields the advantage that the fade-in and fade-out arrangement does not in any way influence the operation of the exposure control system.

In a further preferred embodiment of the present invention the timing circuit means comprise an operational amplifier. The timing circuit means comprise further a capacitor connected between the output and the inverting input of said operational amplifier, and a resistor also connected to said inverting input. The other terminal of the resistor is connected to switch means which alternately connected either to a battery or to the direct input of said operational amplifier means. Further, in a preferred embodiment of the present invention the direct input of the operational amplifier means is connected to a tap on the battery.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING:

The single Figure shows an embodiment of the present invention.

DESCRIPTION OF THE PREFERRED EMBODIMENT:

A preferred embodiment of the present invention will now be described with reference to the drawing.

In the single Figure reference numeral 1 denotes a first part of an objective, while reference numeral 2 denotes a second part thereof. Diaphragm leaves which may bo pivoted into the path of the light are denoted by reference numeral 3. The diaphragm leaves cooperate with a moving coil instrument which has windings 5 and 6. Winding 5 is connected with an adjustment resistor 7, while winding 7 is connected to a photoresistor 8. The other terminals of resistors 7 and 8 are connected in common to a resistor 9 whose second terminal is connected to the positive pole of a battery 15. Light travels along a predetermined path designated by O. A portion of this light is deflected by a prism 10 and a mirror 11 to strike the photoresistor 8. The fluid crystal is designated by reference numeral 12 and has first and second electrical connectors designated 13 aNd 14 respectively. Connector 13 is connected to the common point of batteries 15 and 16 which are connected in series. This common point is referred to as a battery tap herein. Connector 14 is connected to the output of an operational amplifier 17. The power required for operational amplifier 17 is supplied by the above-mentioned battery 15 and 16. The operation amplifier is a difference amplifier having an inverting input and a direct input. A capacitor 18, herein referred to as a second circuit element, is connected between the output and the inverting input. Further, the inverting input is connected to one terminal of a resistor 19, herein referred to as first circuit element whose other terminal is connected to the moving arm 22 or a double throw switch having terminals 20 and 21.

When the moving arm 22 makes contact with contract 21, resistor 19 is connected to the direct input of operational amplifier 17. Contact 20 is connected to the positive side of battery 15.

A rotary shutter is designated by reference numeral 23, while the film plane is denoted by reference numeral 24.

The above-described arrangement operates as follows:

The aperture effected by diaphragm leaves 3 varies as a function of the ambient illumination. With switch 20, 21, 22 in the position shown in the Figure, wherein movable arm 22 is connected to contact 21, fluid crystal 23 transmits light, since the inverting input of amplifier 17 is connected to the direct input via movable arm 22.

When a fade-out is desired, movable arm 22 is switched over to make contact with contract 20 thereby furnishing the fade-out signal to the timing circuit means. A voltage will now appear at the output of amplifier 17 which increases with a time constant determined by capacitor 18 and resistor 19. This causes fluid crystal 12 to become opaque.

If, following this fade-out, a fade-in is desired, switch 22 is moved back to make contact with contact 21 thereby furnishing the fade-in signal to the timing circuit means. Capacitor 18 discharges slowly and with a time constant again determined by its capacitance and the resistance of resistor 19, as well as the characteristics of amplifier 17. When capacitor 18 is fully discharged crystal 12 is of course fully light transmissive. The fade-in has thus ended.

It will be noted that diaphragm leaves 3 are no way affected by the operation of the fade-in and fade-out controlled by fluid crystal 12. These diaphragm leaves remain in the position wherein proper exposure of the film results for the given light conditions, regardless of the operation of the fade-in and fade-out arrangement of the present invention.

The operation amplifier 17 in the Figure is a standard commercial unit, as, for example, circuit type Ser. No. 52,702A, General-Purpose Operational Amplifier of Texas Instruments. This amplifer is fully described on pages 3–18 and 3–19 of the "integrated Circuit Catalog for Design Engineers" of the Texas Instruments Co.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. In a motion picture camera having film means and objective lens means, and wherein light travels along a predetermined path from said objective lens means to said film means, a fade-in and fade-out arrangement comprising, in combination, fluid crystal means positioned in said predetermined path of said light, and having a light transmissivity varying in dependence upon an electrical signal applied thereto; and timing circuit means connected to said fluid crystal means for furnishing a timing signal varying as a predetermined function of time upon external activation, said timing signal constituting said electrical signal, said timing circuit means comprising a source of electrical energy, operational amplifier means having a direct input, an inverting input and an output, a resistor connected to said inverting input, a capacitor connected between said output and said inverting input, and externally operable switch means for connecting said resistor to said source of electrical energy when in a first state and for connecting said resistor to said direct input of said operational amplifier means when in the second state.

2. A motion picture camera as set forth in claim 1, wherein said fluid crystal means has first and second electrical contact means; further comprising first connecting means for connecting said first electrical contact means to said output of said operational amplifier means and said second electrical contract means to said direct input of said operational amplifier means.

3. A motion picture camera as set forth in claim 2, wherein said source of electrical energy comprises battery means having a battery tap; further comprising second connecting means for connecting said battery tap to said direct input of said operational amplifier means.

4. A motion picture camera as set forth in claim 2, wherein said first timing element comprises a resistor; and wherein said second timing element comprises a capacitor.

5. A motion picture camera as set forth in claim 1, wherein said light transmissivity of said fluid crystal means decreases in response to increasing voltages applied thereto.

6. A motion picture camera as set forth in claim 1, further comprising exposure control means positioned in said predetermined path of said light, and wherein said fluid crystal means is positioned in said predetermined path following said exposure control means in the direction of travel of said light.

7. In a motion picture camera having film means and objective lens means, and wherein light travels along a predetermined path from said objective lens means to said film means, a fade-in and fade-out arrangement comprising, in combination, fluid crystal means positioned in said predetermined path of said light, said fluid crystal means having electrical contact means and having a light transmissivity varying in dependence upon variations of an electrical signal applied to said electrical contact means; timing circuit means having an output connected to said electrical contact means for furnishing said electrical signal thereto, said timing circuit means having a first and second circuit element for controlling the rate of change of said electrical signal in response to a fade-in signal and a fade-out signal applied to said timing circuit means; and switch means connected to said timing circuit means and externally operable from a first to a second state and from said second to said first state for furnishing, respectively, said fade-in and fade-out signal.

8. In a motion picture camera having film means and objective lens means, and wherein light travels along a predetermined path from said objective lens means to said film means, a fade-in and fade-out arrangement, comprising, in combination, fluid crystal means positioned in said predetermined path of said light, said fluid crystal means having a light transmissivity varying in correspondence to variations in an electrical signal applied thereto; amplifier means connected to said fluid crystal means for furnishing said electrical signal thereto; first and second circuit element connected to said amplifier means in such a manner that said electrical signal varies gradually as a predetermined function of time in response to a fade-in and fade-out signal; and switch means connected to said amplifier means for furnishing said fade-in and fade-out signal in response to external activation.

9. A motion picture camera as set forth in claim 8, further comprising a source of electrical energy; wherein said amplifier means comprises operational amplifier means having a direct input, an inverting input and an output; wherein said first circuit element is interconnected between said switch means and said inverting input of said operational amplifier means; wherein said second circuit elemnt is interconnected between said output and said inverting input of said operational amplifier means; and wherein said switch means have a first state connecting said first circuit element to said source of electrical energy and a second state connecting said first circuit element to said direct input of said operational amplifier means.

10. In a motion picture camera having film means and objective lens means, and wherein light travels along a predetermined path from said objective lens means to said film means, a fade-in and fade-out arrangement, comprising, in combination, fluid crystal means positioned in said predetermined path of said light, and having a light transmissivity varying in dependence upon an electrical signal applied thereto; and timing circuit means including a resistor and a capacitor, connected to said fluid crystal means, for furnishing a timing signal varying as a predetermined function of time upon external activation, said timing signal constituting said electrical signal.

* * * * *